United States Patent [19]

Bunk et al.

[11] 3,846,370

[45] Nov. 5, 1974

[54] SEALING ELEMENT AND COMPOSITION

[75] Inventors: Albert R. Bunk, Columbus; Bailey Bennett, Worthington, both of Ohio

[73] Assignee: Shatterproof Glass Corporation, Detroit, Mich.

[22] Filed: June 7, 1973

[21] Appl. No.: 367,815

Related U.S. Application Data

[63] Continuation-in-part of Ser. No. 186,401, Oct. 4, 1971, abandoned.

[52] U.S. Cl. .... 260/42.36, 260/85 RR, 260/85.3 C, 260/94.7 A, 260/94.7 N
[51] Int. Cl... C08c 11/18, C08c 11/08, C08c 11/40
[58] Field of Search..... 260/94.7 A, 94.7 N, 41.5 R, 260/85.3 R, 85.3 C

[56] References Cited
UNITED STATES PATENTS
2,974,377    3/1961    Kunkle............................... 260/888

FOREIGN PATENTS OR APPLICATIONS
1,330,763    5/1963    France

OTHER PUBLICATIONS
Adhesives Age, Sept. 1969, pages 30–31; "New Butyl-rubber Offers Advantages as Window & Construction Sealant".
Rubber World; Materials & Compounding Ingredients for Rubber & Plastics, N.Y. 1965, pages 133, 145, 155, & 191. TS1890I53.
Damusis; Sealants, Reinhold, N.Y., 1967, pages 88–89, 278–279 & 287–289. TP988D3.

*Primary Examiner*—Morris Liebman
*Assistant Examiner*—H. H. Fletcher
*Attorney, Agent, or Firm*—Kenneth R. Warburton; William E. Nobbe

[57] ABSTRACT

An elongated strip as a hermetic sealing element in multiple glaze construction of spaced-apart glass sheets mounted in a metal channel peripheral member, which elongated strip is a tacky, moisture and vapor impervious composition predominately of a heat-processed, partially cured dinitrosobenzene cross-linked low-molecular weight butyl rubber from masticating at between 280°F and 310°F for at least twelve and up to sixty minutes total masticating time that blend of components which for heat processing and partial curing and cross-linking comprises: 100 parts by weight of the butyl rubber copolymer, having a viscosity average molecular weight between 10,000 and 45,000, of 96 to 95.5 parts of isobutylene and 4 to 4.5 parts of isoprene; and between 2¼ and 9 parts of a non-sulfur cure system providing dinitrosobenzene cross-linking moieties.

5 Claims, No Drawings

SEALING ELEMENT AND COMPOSITION

REFERENCE TO RELATED APPLICATION

This application is a continuation-in-part application of our application Ser. No. 186,401, filed Oct. 4, 1971, which is abandoned.

DISCLOSURE

This invention relates to a sealing element and composition for glazing purposes. More particularly, it concerns an elongated strip of a novel sealing composition as a hermetic sealing element in a multiple glazed unit, which novel sealing composition is based on a low-molecular-weight butyl rubber subjected to a special cure system and processing to provide a heat-processed, partially cured dinitrosobenzene cross-linked butyl rubber composition providing desirable and requisite properties for glazing purposes in a multiple glaze unit.

In multiple glazed unit construction, there is utilized a sealing composition as a hermetic sealing element to adhere glass to metal surfaces, and generally to provide several spaced-apart glass sheets mounted in a metal-channel peripheral member. In such constructions, the spaced-apart glass sheets provide an enclosed dry-gas-filled, usually of air, insulation barrier of superior thermal insulation properties in comparison to a single glass sheet construction. In these multiple glass sheet constructions, the sealing composition is required to adhere to the glass and also to the metal frame, usually a peripheral U-shaped cross-sectioned channel-like member, and to space apart the glass sheets. This sealing composition should possess not only suitable adhesion properties to glass and metal, but also should not be subject to cold flow, for in the usual construction the channel-like metal members are in a continuing pressure engagement on the glass sheets and sealing composition held between flanges of the channel member, generally a U or C-shaped spring-steel or aluminum construction. The sealing composition also should withstand extremes of temperature, ultraviolet radiation, be impermeable to water vapor, and not give off any by-products or components to contaminate the gas or air insulation barrier and surfaces of the glass sheets.

Hitherto, butyl rubber has been known as a constituent for useful sealing compositions and elements. However, as illustrated by U.S. Pat. No. 2,974,377, Kunkle, in such sealing compositions there invariably was included tackifying constituents, such as polyisobutylene, along with the butyl rubber in the compositions of the aforementioned patent, to provide adequate adhesive properties and invariably these mixtures of butyl rubber and polyisobutylene then were vulcanized completely. Also, as reported by *C&E News*, Apr. 21, 1969, page 15, and *Adhesives Age*, September, 1969, pages 30–31, a low-molecular-weight butyl rubber has been deemed promising for use in sealing compositions. However, it is understood that sealing compositions employing such low-molecular-weight butyl rubber to date also have been formulations wherein the butyl rubber has been cured fully and another constituent, such as a silane, is included as an essential constituent therein in order to provide adherence to glass.

It now has been discovered that inclusion of supplementary constituents to provide adherence is not necessary in useful sealing compositions based on low-molecular-weight butyl rubber, provided there is utilized a special cure system and heat processing to provide the low-molecular-weight butyl rubber component in a particular partially cured state. The resulting sealing composition of a heat-processed, partially cured dinitrosobenzene cross-linked, low-molecular-weight butyl rubber possesses requisite and essential properties to provide a long service life in a multiple glazed unit construction.

The sealing element of the invention is a novel tacky, moisture and vapor impervious composition in an elongated strip as a hermetic sealing element in a multiple glaze unit construction. As an exemplary embodiment (not illustrated herein by drawing) of the invention's sealing element, the invention's elongated strip in cross-sectional profile may be of an upright U-configuration having horizontal extending projections on each side of the base portion of its U-configuration with these projections overlapping edges of two glass sheets and spacing these edges from contact with the base portion of a generally U-shaped cross-sectioned metal channel member of a multiple glaze unit. Each of two upwardly extending leg portions of the elongated strip's U-configuration lie intermediate a spacer element and a glass sheet and are pressed in compression against the spacer element by the glass sheet with the two glass sheets held in such position and under such tension by upwardly extending leg portions of the U-shaped cross-sectioned metal channel member. U.S. Pat. No. 2,974,377, Kunkle, in its FIGS. 1 and 2 illustrates a like embodiment for his sealing compound 22 in like relationship in a multiple glaze unit 10 which to illustrate the present invention's exemplary embodiment would differ by employing this invention's novel sealing composition as his compound 22.

The novel sealing composition comprises a heat-processed, partially cured dinitrosobenzene cross-linked low-molecular-weight butyl rubber which prior to its heat processing and partial curing and cross-linking is a low-molecular-weight copolymer, having a viscosity average molecular weight between 10,000 and 45,000, of 96 to 95.5 parts of isobutylene and 4 to 4.5 parts of isoprene. More particularly, prior to heat-processing and cross-linking, the sealing composition in parts by weight consists essentially of a blend of 100 parts of the low-molecular weight copolymer, up to 5 parts of zinc oxide, up to 10 parts of carbon black, and between 2¼ and 9 parts of a non-sulfur cure system which includes a cure constituent functioning to provide a dinitrosobenzene cross-linking moiety, and also preferably includes a cure constituent to provide a mononitrosobenzene moiety, with the heat processing being by mastication at between 280°F and 310°F for at least twelve and up to 60 minutes total masticating time. The sealing composition generally also includes up to 2 phr (based on the butyl rubber) of a nonstaining amine-type antioxidant stabilizer, such as sym-dibetanaphthyl-p-phenylene diamine. It also may include minor amounts of up to several phr of other antioxidants, antiozonants, ultraviolet absorbers, along with clays, silicas, and like constituents known to the art to be useful in butyl rubber-base compositions for such purposes.

The low-molecular-weight butyl rubber utilized in the sealing composition of the invention is of a viscosity average molecular weight within the range of about 10,000 to 45,000 and is the copolymer of isobutylene with between about 4.0 and 4.5 percent isoprene, i.e., its mole percent unsaturation lies between 4.0 and 4.5 percent and generally is about 4.2 percent. It is semiliquid in appearance. In contrast, conventional butyl rubber is solid-like and generally is of a viscosity average molecular weight in the order of 300,000 with an isoprene content or mole percent unsaturation falling between 0.8 and about 2.5 percent. It is understood that presently commercially available low-molecular-weight butyl rubber is prepared by a proprietary process that produces a narrow molecular weight distribution which maximizes tensile strength and minimizes viscosity for a given molecular weight. That process is a cationic polymerization process employing a different catalytic system and higher operating temperatures than are used in producing high-molecular-weight butyl rubber. In conventional high-molecular-weight butyl rubber production, the isobutylene and isoprene in methyl chloride are chilled to −140°F before injection into the polymerization reactor with the reaction maintained closely in the neighborhood of −140°C. In the proprietary process for preparing the low-molecular-weight butyl rubber, solvent is evaporated in its finishing stage under conditions of low heat and high vacuum; while in conventional high-molecular-weight butyl production, the solvent is flashed off under hot water. This proprietary process has made low-molecular-weight butyl rubber available commercially as heretofore the required higher isoprene requirements for low-molecular-weight butyl tended to poison the aluminum chloride polymerization catalyst conventionally used for producing high-molecular-weight butyl rubber. However, it is understood that low-molecular-weight butyl rubber also is preparable although not necessarily in the most practical and economical manner, by substantially the same process conventionally used for preparing high-molecular-weight butyl rubber except that the reaction is modified and carried forth at slightly higher temperatures (about −125°F) and with means employed to replenish and supply fresh aluminum chloride catalyst as the catalyst becomes poisoned during polymerization.

Literature teaches that low-molecular-weight butyl rubber can be cured with the same high-temperature catalyst systems, e.g. sulfur cure system, used for conventional butyl rubber. The art also teaches that a room-temperature cure of the low-molecular-weight butyl rubber is possible through employment of a two-part system of para-quinonedioxime and an oxidizer in ratios by volume between 1:1 and 20:1, respectively. Depending on desired rate of cure for a specific application, amounts within the aforesaid range of this two-part system are taught in the art to cure the rubber in anywhere from a few hours to several weeks.

The non-sulfur cure system, included in the blend containing the low-molecular-weight butyl rubber, of the sealing composition, is devoid of sulfur-containing constituents and sulfur. This non-sulfur cure system always includes a cure constituent functioning directly or indirectly to provide dinitro-sobenzene cross-linking moieties. It may, and generally does, include cure constituents functioning to provide a compound containing a mononitroso group. The cure system employed to provide the preferred sealing composition includes two cure constituents for providing respectively di- and mononitrosobenzene moieties. Dinitrosobenzene moieties serve to cross-link the low-molecular-weight butyl rubber. The mononitrosobenzene moieties, while not functioning to cross link, serve to control sites available for cross-linking in the low-molecular-weight butyl rubber apparently through satisfying or hindering available sites of unsaturation in the rubber from cross-linking.

The cure system also always includes a cure constituent functioning to activate or retard the various other included cure constituents into providing their respective mono- and di-nitroso moieties. The retarder also prevents scorching.

Cure constituents functioning directly to provide dinitrosobenzene cross-linking moieties include: p-dinitrosoaniline and N-lower alkyl-N, 4-dinitrosoanilines, such as illustrated by N-methyl-N,4-dinitrosoaniline; dinitrosocymene; 3,7-dinitroso-1,3,5,7-tetraazobicyclo [3.31] nonane; and the like dinitrosoaromatic compounds. Cure constituents functioning to provide the dinitrosobenzene cross-linking moiety in an indirect manner, such as upon activation (e.g., oxidation) thereof, include: p-quinonedioxine; diesters of p-quinonedioxime, such as illustrated by quinonedioxime dibenzoate and quinone dioxime dicaproate; and the like quinonedioxime compounds which are readily oxidizable to their dinitrosostructures. Constituents functioning to provide a mononitroso moiety include: N-(nitroalkyl)-4- nitrosoanilines, such as illustrated by N-(2-methyl-2-nitropropyl)-4-nitrosoaniline; and like mononitrosoaromatic compounds including both a nitroso group and generally also a nitro group.

In addition to cure constituents functioning to provide di- and mononitrosobenzene moieties, the cure system of the invention generally includes a multihalogenated p-benzoquinone, such as tetrachloro-p-benzoquinone. A multihalogenated p-benzoquinone always is included in an amount of at least 1.5 parts per 100 parts by weight of the low-molecular-weight butyl rubber when the employed cure system includes 5 parts and greater total of constituents providing di- and mononitrosobenzene moieties and multi-halogenated p-benzoquinone for each 100 parts by weight of the low-molecular-weight butyl rubber. It not only serves as an activator or agent for constituents providing the di- and/or mononitrosobenzene moieties, but possibly also serves to cross-link and/or vulcanize the low-molecular weight butyl rubber in that it is a known vulcanizer for several synthetic rubbers.

Whether the cure system includes an additional constituent to activate or one to retard the therein included constituents respectively functioning to provide mono- and di-nitroso moieties depends on the amount of other included constituents. With an amount totaling less than about 5 parts by weight for each 100 parts by weight of the low-molecular-weight butyl rubber in the cure system of a multihalogenated p-benzoquinone and constituents functioning to provide their respective mono- and di-nitroso moieties, then there is included an activator. Such an activator may be a suitable oxidizing agent for the useful dioximes in order to oxidize =NOH groups to −NO groups so as to provide the requisite dinitroso cross-linker. Useful agents for those purposes include basic inorganic oxides, such as zinc oxide, magnesium oxide, calcium oxide, litharge (PbO), lead dioxide ($PbO_2$), red lead ($Pb_3O_4$), and the like agents. When the cure system contains a multihalogenated p-benzoquinone and constituents, providing mono- and di-nitroso moieties, in an amount totaling about 5 and greater parts by weight for each 100 parts by weight of the low-molecular-weight butyl rubber, then there is included a retarder or inhibitor for the included constituents providing the nitroso moieties. Illustrative of a useful retarder is p,p-diaminodiphenylmethane.

In general, the non-sulfur cure system, included in the blend which is heat-processed into the sealing composition of the invention, will include between 2¼ and 9 parts by weight total (based on each 100 parts by weight of the low-molecular-weight butyl rubber in the blend) of cure constituents. More particularly, and as will be apparent from the specific examples herein, the special cure system included in the sealant composition of the invention includes a constituent providing a dinitrosobenzene cross-linking moiety with at least two (i) constituents from the group consisting of N-(2-methyl-2-nitropropyl)-4-nitrosoaniline, tetrachloro-p-benzoquinone, and p-quinonedioxime, and also a (ii) constituent of a lead dioxide when employing less than 1.5 parts by weight of tetrachloro-p-benzoquinone or when the total of the (i) cure constituents is less than 5 parts by weight for each 100 parts by weight of the low-molecular-weight butyl rubber, and also a (ii) constituent of p,p'-diaminodiphenylene diamine when employing 1.5 and greater parts by weight of tetrachloro-p-benzoquinone or when the total of the (i) constituents is 5 parts and greater for each 100 parts by weight of the butyl rubber.

In these more particularly described cure systems, there are included at least two (i) constituents of N-(2-methyl-2-nitropropyl)-4-nitrosoaniline, tetrachloro-p-benzoquinone, and p-quinonedioxime (provides the dinitrosobenzene cross-linking moiety) in a total amount thereof between 1.5 and 8.5 parts by weight (based on each 100 parts by weight of the low-molecular-weight butyl rubber) with the included amount of N-(2-methyl-2-nitropropyl)-4-nitrosoaniline being up to 2 parts by weight and being less than one-half by weight of the total amount of (i) constituents, the included amount of tetrachloro-p-benzoquinone being up to 2.5 parts by weight and being at least 1.5 parts when the included total of (i) constituents is 5 and greater, and the included amount of p-quinonedioxime being from 0.25 to 5 parts by weight.

Also in these more particularly described cure systems there is included a (ii) constituent which is either lead dioxide or p,p'-diaminodiphenylmethane. One may include up to 4 parts by weight (based on each 100 parts by weight of the low-molecular-weight butyl rubber) of lead dioxide, in a finely divided form of less than about 0.4 micron size, most generally and preferably of about 33 micron size or smaller. The cure system should and does include lead dioxide in an amount between ¾ and 3¾ parts by weight when the (i) cure constituents include less than 1.5 parts by weight of tetrachloro-p-benzoquinone or the included total of the (i) cure system constituents is less than about 5 parts by weight. One can include up to ½ part by weight of p,p'-diaminodiphenylmethane, and should and does include between 0.1 and 0.5 parts by weight when the (i) cure constituents include 1.5 and greater parts by weight of tetrachloro-p-benzoquinone or the included total of the (i) constituents is 5 and greater parts by weight.

To enhance properties and appearances of the sealing composition and to assist in stabilizing the composition from possibly degradative influences of ultraviolet light, it is desirable to include up to 10 phr (based on the butyl rubber), and there generally is included between 1 and 10 parts by weight, of carbon black, most usually a furnace black, such as FEF carbon black. Zinc oxide most generally also is included as a component up to 5 phr (based on the butyl rubber) of the sealing composition and preferably is included in an amount between 1 and 5 parts by weight. The zinc oxide serves to aid in blending the composition's components and may serve as a reinforcer. The zinc oxide also likely assists in activating and in obtaining a cure of the butyl rubber to its particular partially cured state so requisite for the intended application of the composition.

Most generally the sealing composition also includes up to about 2 parts by weight (based on each 100 parts by weight of the low-molecular-weight butyl rubber) of a antioxidant-antiozonant stabilizer. Preferred are the non-staining amine-type antioxidants. A particularly useful stabilizer is sym-dibetanaphthyl-p-phenylene diamine, such as AgeRite White (R. T. Vanderbilt Company, Inc.), although other well-known and conventional stabilizers may be used instead. As illustrative of other useful stabilizers there are: N,N'-dioctyl-p-phenylene diamine; diphenyl-p-phenylenediamine; N-phenyl-n'-isopropyl-p-phenylenediamine; N-phenyl-N'-cyclohexyl-p-phenylene diamine, and the like.

In general to provide the sealing composition of the invention containing predominantly a heat-processed, dinitrosobenzene cross-linked low-molecular-weight butyl rubber, one compounds and heat processes by masticating at between 280°F and 310°F for at least 12 and up to 60 minutes total masticating time that blend of components which consists essentially of the low-molecular-weight butyl rubber, zinc oxide and carbon black when included, and between 2¼ and 9 parts of the non-sulfur cure system.

As will be apparent from specific examples herein, the compounding and heat-processing can be accomplished through employment of a two-roll rubber mill. The low-molecular-weight butyl rubber, zinc oxide, and carbon black are milled together until a substantially homogeneous blend thereof results. Generally this is accomplished with heating of the rolls to gradually raise the blend to a temperature suitable for addition subsequently of the cure system constituents and, if used, of the stabilizer, and also a temperature requisite for the heat processing of the blend containing the cure constituents. Thus, while the butyl rubber/zinc oxide/carbon black blend is being dynamically mixed, as by mastication on a two-roll mill at a temperature between 260°F and 305°F, one blends therewith a (i) cure constituent. Mastication then is continued for at least 12 or up to 60 minutes total mastication time at between 280°F and 310°F. Where the aforementioned (i) cure constituents include both N-(2-methyl-2-nitropropyl)-4-nitrosoaniline and tetrachlorobenzoquinone, they may be added and blended separately or together as long as the last added is present in the masticated blend for at least 12 minutes of the total mastication time at a temperature between 280°F and 310°F. Thereafter the remaining (i) constituent of p-quinonedioxime, if included, is added and masticated therein, and is added and masticated therein while there remains at least 12 minutes of the total mastication time at a temperature between 280°F and 310°F. Thereafter the aforementioned (ii) constituent of p,p'-diaminodiphenylmethane, when included is added and masticated therein and is so added and masticated therein after elapsing of at least 30 percent and before elapsing of 80 percent of the total mastication time. Thereafter the aforementioned (ii) cure constituent of lead dioxide, when included, is added and masticated therein and this also is after elapsing of at least 30 percent and before elapsing of 80 percent of the total masticating time. This added lead dioxide is by addition of several incremental portions thereof at intervals during that period of the total masticating time, with each added incremental portion being between 10 and 60 percent of the total amount of the lead dioxide being added. Thereafter the stabilizer component of the sealing composition, when included, is added and blended therewith during the last 15 percent of the total dynamic heat processing at 280°F to 310°F, and generally added so that at least several minutes remain of the total mastication time to enable a homogenous distribution of the stabilizer component. Following completion of the total time of the heat-processing, the composition is removed and placed on release paper in masses of less than about 5 inches thick and allowed to cool before utilizing for its intended purpsoes. Heat dissipates from the heat-processed composition more rapidly when the masses are less than about 5 inches thick. If left to cool in greater-size masses before dissipating, the heat in the interior of the greater size masses before dissipating is likely to provide a composition with less desirable properties.

Although as just described and also as illustrated in the specific examples, the specific heat processing employs mastication by means of a two-roll mill, other apparatus also may be utilized for providing the requisite heat processing and mastication. For example, one may utilize a Baker-Perkins churn type mixer equipped with dispersion blades and a floating ram, or a Banbury-type mixer, or preferably a mixer-extruder, or kneader-extruder type, or like apparatus wherein the blend of the low-molecular-weight butyl rubber and the requisite cure system constituents may be dynamically mixed or masticated while subjected to a temperature between 280°F and 310°F for at least 12 minutes and up to 60 minutes.

The invention now will be more fully understood by reference to the specific examples thereof which follow:

EXAMPLE A

A sealing composition of the following formulation is prepared:

|  | Parts by Weight |
| --- | --- |
| Low-molecular-weight butyl rubber of a viscosity average molecular weight of about 32,000 and having about 4 mole percent unsaturation, such as Enjay Butyl LM430 | 84.0 |
| Zinc Oxide (Grade XX4) | 3.0 |
| FEF carbon black (N-550) | 5.875 |
| Stabilizer, Sym-dibetanaphthyl p-phenylene diamine, such as AgeRite White (R.T. Vanderbilt Co., Inc.) | 1.25 |

-Continued

|  | Parts by Weight |
| --- | --- |
| Special cure system |  |
| N-(2-methyl-2-nitropropyl)-4-nitrosoaniline, such as Nitrol* (Monsanto Company) | 0.5 |
| p-quinonedioxime, such as GMF (Naugatuck Chemical) | 1.25 |
| Lead dioxide (about 0.33 micron size) | 3.125 |

*Only about ⅓ by weight of Nitrol consists of N-(2-methyl-2-nitropropyl)-4-nitrosoaniline and the balance thereof consists of inert material, and therefor one would employ 1.5 parts of Nitrol in Formulation A.

This composition is prepared on a two-roll rubber mill. The butyl rubber is added to the mill allowing a bank of rubber between rolls. Next, the rolls are heated with 82 psi (gage) steam pressure. The full amounts of the zinc oxide and carbon black are added immediately after the steam is turned on. When the steam pressure has reached about 50 psi (i.e., roll temperature of about 265°F), the full amount of N-(2-methyl-2-nitropropyl)-4-nitrosoaniline is added and worked into the batch within a one-minute period. As the steam pressure reaches about 75 psi (i.e., about 290°F roll temperature), a timer is set for 15 minutes. The material is permitted to shear-mix on the two-roll mill for 15 minutes with the steam pressure being about 82 psi (about 300°F roll temperature) during about the latter three-fourths of this 15 minute milling. During this time the material is being mixed by scraping it off the rolls and adding it to the mill again. Whereupon the p-quinonedioxime and the first of three increments of lead dioxide are added. The first and second lead dioxide incremental additions each are about 1.25 parts by weight and the third is about 0.625 parts by weight. The timer is set for five minutes during which the mixture is continuously mixed. After the five minutes have expired, the second increment of lead dioxide is added and mixed into the batch for another 5 minutes. Whereupon the third increment of lead dioxide is added and the timer set for 10 minutes during which the mixture is continuously mixed. 3 minutes prior to removal of the batch, a stabilizer, syndibeta-naphthyl-p-phenylene diamine is added and mixed into the material. The sealant is removed by scraping it off the rolls onto release paper. The sealant masses are less than 5 inches thick and are allowed to cool before use.

EXAMPLE B

A sealing composition of the following formulation is prepared:

|  | Parts by Weight |
| --- | --- |
| Low-molecular-weight butyl rubber of a viscosity average molecular weight of about 32,000 and having about 4 mole percent unsaturation | 84.0 |
| Zinc Oxide (Grade XX4) | 3.0 |
| FEF carbon black (N-550) | 7.15 |
| Stabilizer, Sym-dibetanaphthyl-p-phenylene diamine | 1.25 |
| Special cure system |  |
| N-(2-methyl-2-nitropropyl)-4-nitrosoaniline | 0.42 |
| Tetrachloro-p-benzoquinone, such as Vulklor (Naugatuck Chemical) | 0.20 |
| p-quinonedioxime | 0.90 |
| Lead dioxide (about 0.33 micron size) | 2.25 |

This composition is prepared by the procedure of Example A, with two exceptions. All the tetrachloro-p-benzoquinone is added along with the N-(2-methyl-2-nitropropyl)-4-nitrosoaniline and the incremental additions of lead dioxide are about 0.90 parts by weight for the first and second addition with the third about 0.45 parts by weight.

EXAMPLE C

A sealing composition of the following formulation is prepared:

|  | Parts by Weight |
|---|---|
| Low-molecular-weight butyl rubber of a viscosity average molecular weight of about 32,000 and having about 4 mole percent unsaturation | 84.0 |
| Zinc Oxide (Grade XX4) | 3.0 |
| FEF carbon black (N-550) | 8.0 |
| Stabilizer, Sym-dibetanaphthyl-p-phenylene diamine | 1.25 |
| Special cure system N-(2-methyl-2-nitropropyl)-4-nitrosoaniline | 0.34 |
| Tetrachloro-p-benzoquinone | 1.0 |
| p-quinonedioxime | 0.5 |
| Lead dioxide (~0.33 micron size) | 1.25 |

This composition is prepared on a two-roll rubber mill. The butyl rubber, is added to the mill at room temperature allowing a bank of rubber between rolls. Next, the rolls are heated with 82 psi (gage) steam. The full amounts of the zinc oxide and carbon black are added immediately after the steam is turned on. When the steam pressure reaches about 50 psi (i.e., roll temperature of about 265°F) the full amounts of N-(2-methyl-2-nitropropyl)-4-nitrosoaniline and tetrachloro-p-benzoquinone are added and worked into the batch within a one-minute period. As the steam pressure reaches about 75 psi (i.e., about 290°F roll temperature) a timer is set for 15 minutes. The material is permitted to shear-mix on the two-roll mill for fifteen minutes with the steam pressure being about 82 psi (about 300°F roll temperature) during about three-fourths of this 15 minute milling. During this time the material is being mixed by scraping it off the rolls and adding it to the mill again. Whereupon the p-quinonedioxime and the first of three increments of lead dioxide are added. The first and second lead dioxide incremental additions each are about 0.5 parts by weight and the third is about 0.25 parts by weight. The timer is set for 10 minutes during which the mixture is continuously mixed. After the 10 minutes have expired, the second increment of lead dioxide is added and mixed into the batch for another 10 minutes. This is repeated for the last increment of lead dioxide, also. Three minutes prior to removal of the batch, stabilizer, sym-dibetanaphthyl-p-phenylene-diamine is added and mixed into the material. The sealant is then removed by scraping it off the rolls onto release paper. The sealant masses are less than 5 inches thick and are allowed to cool before use.

EXAMPLE D

A sealing composition of the following formulation is prepared:

|  | Parts by Weight |
|---|---|
| Low-molecular-weight butyl rubber of a viscosity average molecular weight of about 30,000 and having about 4 percent unsaturation, such as Enjay LM Butyl MD504 | 83.0 |
| Zinc Oxide (Grade XX4) | 3.0 |
| FEF carbon black (N-550) | 8.25 |
| Stabilizer, sym-dibetanaphthyl-p-phenylene-diamine | 1.5 |
| Special cure system N-(2-methyl-2-nitropropyl)-4-nitrosoaniline | 0.34 |
| Tetrachloro-p-benzoquinone | 1.0 |
| p-quinonedioxime | 0.75 |
| Lead dioxide (~0.33 micron size) | 1.5 |

This composition is prepared by the procedure of Example C except for the amounts of the lead dioxide incremental additions. The first incremental addition is about 0.25 parts by weight, the second increment about 0.5 parts by weight, and the third about 0.75 parts by weight.

EXAMPLE E

A sealing composition of the following formulation is prepared:

|  | Parts by Weight |
|---|---|
| Low molecular weight butyl rubber of an average molecular weight of about 32,000 and having about 4 percent unsaturation | 85.0 |
| Zinc Oxide (Grade XX4) | 3.0 |
| FEF carbon black (N-550) | 7.5 |
| Stabilizer, sym-dibetanaphthyl-p-phenylene diamine | 1.5 |
| Special cure system N-(2-methyl-2-nitropropyl)-4-nitrosoaniline | 0.34 |
| Tetrachloro-p-benzoquinone | 1.0 |
| p-quinonedioxime | 0.25 |
| Lead dioxide (about ~ 0.33 micron size) | 0.75 |

This composition is prepared substantially by the procedure of Example C except for the number and amounts of the incremental additions of the lead dioxide and number 4 incremental additions with 10 minutes mixing between additions. The first and second incremental additions are about 0.25 parts by weight and the third and fourth incremental additions each are 0.125 parts by weight.

EXAMPLE F

A sealing composition of the following formulation is prepared:

|  | Parts by Weight |
|---|---|
| Low-molecular-weight butyl rubber of an average viscosity molecular weight of about 32,000 and having about 4 mole percent unsaturation | 83.0 |
| Zinc Oxide (Grade XX4) | 3.0 |
| FEF carbon black (N-550) | 7.375 |
| Stabilizer, sym-dibetanaphthyl-p-phenylene diamine | 1.5 |
| Special Cure system | |
| N-(2-methyl-2-nitropropyl)-4-nitrosoaniline | 0.34 |
| Tetrachloro-p-benzoquinone | 1.0 |
| p-quinonedioxime | 1.125 |
| Lead dioxide (about 0.33 micron size) | 2.0 |

This composition is prepared like Example C except for the time intervals and incremental additions of the lead dioxide. The first and second lead dioxide incremental additions each are about 0.5 part with a 7-minute mixing time for each addition. The third incremental addition is about 1.0 part and the mixing time thereafter is for fourteen minutes before the stabilizer is added.

EXAMPLE G

A sealing composition of the following formulation is prepared:

|  | Parts by Weight |
|---|---|
| Low-molecular-weight butyl rubber of an average viscosity molecular weight of about 32,000 and having about 4 mole percent unsaturation | 83.0 |
| Zinc Oxide (Grade XX4) | 3.0 |
| FEF carbon black (N-550) | 4.0 |
| Special cure system | |
| N-(2-methyl-2-nitropropyl)-4-nitrosoaniline | 1.25 |
| Tetrachloro-p-benzoquinone | 2.0 |
| p-quinonedioxime | 4.0 |
| p,p'-diaminodiphenylmethane, such as Tonox (Naugatuck Chemical) | 0.25 |

This composition is prepared like Example C except after the addition of the N-(2-methyl-2-nitropropyl)-4-nitrosoaniline no tetrachloro-p-benzoquinone is added at that time. After the 15 minutes hold, the full amounts of tetrachloro-p-benzoquinone and p,p'-diaminodiphenylmethane are added within a 1-minute period. The full amount of p-quinonedioxime is added then. The timer is set for 15 minutes during which the mixture is continuously mixed. A stabilizer is not added. The sealant then is removed by scraping off the rolls.

A composition G(1) is prepared as in Example G except that the N-(2-methyl-2-nitropropyl)-4-nitrosoaniline is eliminated, and its Mooney viscosity is found to be about three-fourths that of the Example G composition containing both the p-quinonedioxime and N-(2-methyl-2-nitropropyl)-4-nitrosoaniline.

A composition G(2) is prepared as in Example G except that the p-quinonedioxime is eliminated and 3.75 parts of N-(2-methyl-2-nitropropyl)-4-nitrosoaniline are included, and its Mooney viscosity is found to be about 1/30 that of the Example G composition containing p-quinonedioxime. This composition G(2) is not a composition of the invention, but is provided for comparison purposes to demonstrate the need for the cure system to include a constituent providing a dinitrosobenzene cross-linking moiety.

Each of the sealing compositions prepared as described in Examples A through G(2) is formed, such as by extrusion thereof, into an elongated strip of about 0.3 sq. in. cross-section and employed as the sealing element in multiple glaze unit construction. With each of the compositions of A through G(1) in the resulting construction, the sealing composition serves to space glass sheets from metal frame, to adhere satisfactorily to the glass sheets and the metal frame, to provide a satisfactory hermetic seal between the glass sheets, to be subject to little to no cold flow after installation, and in general to provide multiple glazed unit constructions affording a long and useful satisfactory life under normal service conditions in the temperate zone regions of the world. The resulting construction using the composition of Example G(2) was not a satisfactory construction. The elongated strip sealing element was subject to cold flow to an extent to render the construction of little to no commercial value.

Data on properties of the foregoing prepared sealant compositions are reported in the following Tables 1 and 2 and are determined by the following procedures:

Tack Test [1] [2] . . . . . or adhesion in psi between the sealant and a glass probe is determined by allowing a polished glass probe having an area of 0.11 square inch to be brought in contact with the sealant, which has been cut into a 0.75 × 0.75 × 0.50-inch specimen with a smooth level surface and pressed onto a steel circular (1-inch diameter) platform for support, using 4.5 psi pressure and allowing the specimens to be held in contact for varying times. After the selected amount of time, the probe is pulled from the sealant using an Instron tester at 10 inches per minute jaw speed and the psi determined from the data on the automatic recording chart.

[1] Forbes, W. G., and McLeod, L. A., Trans. I.R.I., 34(4), 154 (1958)
[2] Mueller, J. W., Bennett, Bailey, and Stickney, P. B., Rubber Age, 100 (6), 59 (1968).

psi = Instron reading (lbs.)/0.11 sq. in.

Mooney Viscosity. . . . .determined with a Mooney plastometer, in which a large rotor (1.5 inches) is rotated in a mass of rubber and the torque acquired is measured. This test was run at 100°C with a 1-minute warm-up and a 4-minute operating time. See ASTM Method D1646.

Table 1

| Composition Example | A | B | C | D | E | F | G | G(1) | G(2) |
|---|---|---|---|---|---|---|---|---|---|
| Mooney Viscosity (1+4 min.) at 100°C | 15.5 | 16.0 | 18.0 | 26.0 | 4.5 | 36.5 | 45.5 | 34.5 | 1.5 |
| Adhesion, psi | | | | | | | | | |
| Contact Time (minutes) | | | | | | | | | |
| 15 | 28 | 30 | 29 | 30 | 20 | 32 | 23 | 27 | 20 |
| 30 | 28 | 30 | 30 | 31 | 19 | 27 | 25 | 27 | 21 |
| 60 | 35 | 30 | 33 | 28 | 24 | 20 | 25 | 31 | 20 |

Table 1-Continued

| Composition Example | A | B | C | D | E | F | G | G[1] | G[2] |
|---|---|---|---|---|---|---|---|---|---|
| Work, in/lbs. Contact Time (minutes) | | | | | | | | | |
| 15 | 1.22 | 1.98 | 2.14 | 1.10 | 1.86 | 1.04 | 0.66 | 0.86 | 2.82 |
| 30 | 1.52 | 1.88 | 2.16 | 1.06 | 2.16 | 0.58 | 0.82 | 0.56 | 2.46 |
| 60 | 2.42 | 2.20 | 2.44 | 1.14 | 2.50 | 0.46 | 0.88 | 1.16 | 2.78 |
| Compression Set, percent Hours of Recovery | | | | | | | | | |
| ½ | 85 | 94 | 76 | 89 | 127 | 71 | 76 | 71 | 171 |
| 24 | 63 | 75 | 56 | 71 | 121 | 57 | 62 | 56 | 170 |
| 72 | 57 | 67 | 50 | 70 | 120 | 53 | 55 | 48 | 175 |
| 144 | 50 | 63 | 42 | 62 | 122 | 48 | 53 | 45 | 179 |
| 192 | 49 | 59 | 38 | 60 | 121 | 46 | 50 | 44 | 178 |
| 350 | 45 | 52 | 31 | 58 | 124 | 41 | 46 | 41 | 180 |

[1] Formula G without N-(2-methyl-2-nitropropyl)-4-nitroso-aniline.
[2] Formula G without p-quinonedioxime.

Table 2

Data on Aged[1] Specimens

| Composition Example | A | B | C | D | E | F | G | G[2] | G[3] |
|---|---|---|---|---|---|---|---|---|---|
| Mooney Viscosity (1+4 min.) at 100°C | 21.5 | 23.0 | 25.0 | 31.0 | 7.5 | 46.5 | 46.5 | 41.5 | 9.5 |
| Adhesion, psi Contact Time (minutes) | | | | | | | | | |
| 15 | 35 | 36 | 37 | 35 | 24 | 31 | 19 | 27 | 22 |
| 30 | 36 | 33 | 34 | 29 | 25 | 23 | 21 | 30 | 23 |
| 60 | 35 | 35 | 43 | 36 | 29 | 26 | 18 | 29 | 31 |
| Work, in/lbs. Contact Time (minutes) | | | | | | | | | |
| 15 | 1.44 | 2.16 | 1.90 | 1.52 | 2.58 | 0.92 | 0.30 | 0.60 | 2.00 |
| 30 | 1.88 | 1.90 | 2.02 | 1.12 | 2.58 | 0.36 | 0.28 | 0.94 | 2.40 |
| 60 | 2.46 | 2.16 | 3.12 | 1.54 | 3.62 | 0.60 | 0.50 | 0.98 | 2.38 |

NOTE: All specimens improve in resilience as the Mooney viscosity increases. For this reason specific values for Compression Set are not reported.

[1] Specimens aged 2 weeks at 70°C in a forced-air oven.
[2] See Note (1), Table 1
[3] See Note (2), Table 1 compression Set Test. . . . .this test measures the ability of a sealant to recover from a specific amount of constant deflection at a specific temperature and for a specific amount of time. The recovery is measured at periodic intervals and calculated as percent compression set. The test is a modification of ASTM Method D395, Method B, Type 1. Two or more specimens of a batch of sealant are prepared and with the use of a rubber knife provided as about 1 × 1 × ½-inch specimens. A piece of release paper slightly larger in area than the specimen is used on top and bottom of each specimen. Using a dial micrometer, such as an Ames gage (3 ounce weight), the original height of each specimen is determined. Five readings over the square inch area are taken and an average reading determined. These readings can include the thickness of the release paper.

The specimens are placed between the plates of the compression set apparatus. The apparatus is assembled and tightened down. This is placed in a forced-air oven preheated to 100°F. After 24 hours the apparatus is removed from the oven and the specimens removed. After 30 minutes of cooling at approximately 74°F and allowance for recovery, the specimen's height is measured and recorded. Daily readings are made and the progress of recovery followed. The percent compression set is determined on the average of five readings taken each time. A calculation of a value of zero would indicate full recovery. Percent compression set is calculated by means of the following formula:

Percent compression set=Original height (minus) percent height/Original height (minus)0.375(spacer height)×100

Work to Break Sealant-Glass Bond. . . . .the work in inch/pounds required to break the sealant-glass probe bond is obtained with the use of the Instron Integrator. The test specimens are the same as those used to determine the psi of the glass probe-sealant bond mentioned under Tack Test. The number obtained from the Instron Integrator is used in the following formula to calculate the work:

$$W = X/5{,}000 \times L \times S$$

where
W = work in inch/pounds
L = full scale load in pounds
S = rate of sample extension in inches/minutes
X = integrator reading Sample Aging. . . . .all sealant samples are aged in a forced-air oven at 70°C for 2 weeks. After the aging period, samples are allowed to come to room temperature (74°F) before testing.

From the preceding, it is believed apparent in the present invention that the employed special cure system and heat-processing together provide a unique interaction whereby in a reasonable and practical time there is achieved a sealing composition, predominantly of a dinitrosobenzene cross-linked, low-molecular-weight butyl, possessing properties and characteristics requisite for a highly useful sealing element in multiple glaze unit construction. In part, a unique heat processing is obtained in that the presence during the heat processing of the aforedescribed (i) and (ii) cure system constituents results in an interaction of one with the other so as to provide a requisite dinitrosobenzene cross-linking of the butyl rubber in a specified, and also reasonable and practical, processing time.

As a result of the employed special cure system and heat-processing, it is not necessary to include in the invention's sealing compositions those ancillary additives utilized by the prior art to increase adhesion of a sealing composition to the glass sheets and metal frame of the multiple glaze construction.

In addition the uniqueness of the sealing composition of the invention is evidenced by the dinitrosobenzene cross-linked, low-molecular-weight butyl rubber therein contained and the remarkable combination of properties exhibited by this dinitrosobenzene cross-linked, low-molecular-weight butyl rubber. It will be noted, as is requisite for a satisfactory sealing composition in multiple glaze construction, that the composition of the invention provides good adhesion and resilience allowing compression and stretching of sealant without cold flow even under pressure.

The foregoing requisite combination of properties is not found in either the uncured or the fully cured low-molecular-weight butyl rubber. It is provided by the present invention through the low-molecular-weight butyl rubber being given only a partial and incomplete cure from employment of the herein-taught special cure system and heat processing.

While the sealing element of the invention has been described and illustrated herein with specificity as to its various constituents, and especially as to its cure system constituents, and as to heat processing parameters, it should be understood that such specificity is for compliance with patenting requirements and that the invention is contemplated to be of greater breadth. In its broadest scope the invention is of a sealing element predominantly comprised of the aforedescribed low-molecular-weight butyl rubber in a particular partially cured state providing rheological properties requisite for a useful sealing element. The sealing element is free from other essential constituents for imparting adhesion and necessary rheological properties which are provided by the particular partially cured state of the low-molecular-weight butyl rubber, although small amounts of conventional stabilizers, antioxidants, antiozonants, ultraviolet absorbers, fillers, and like ancillary constituents may be included. Particular processing means and parameters to provide the requisite partially cured state are of no import when one can in another specific manner do so. For example, one likely can employ microwaves, radiation, and the like in lieu of the described heat processing to provide that requisite particular partially cured state of the butyl rubber. If one so does, the sealing element of the invention comprises predominantly the aforedescribed low-molecular-weight butyl rubber partially cured to provide the following rheological properties: a Wissenberg Rheogonometer determined complex modulus (dynes/cm.$^2$) to lie within the range of about $9.1 \times 10^5$ to $1.9 \times 10^6$ at 1 Hz and of about $3.6 \times 10^5$ to $9.6 \times 10^5$ at $1/2\pi$ Hz, and preferably about $1.8 \times 10^6$ at 1 Hz and about $8.3 \times 10^5$ at $1/2\pi$ Hz; and a Slope ($\log G^+/\log f$) to be within the range of 0.55 to 0.37 at $1/2\pi$ Hz and within the range of 0.42 to 0.35 at 10 Hz, and preferably about 0.43 at $1/2\pi$ Hz and 0.35 at 10 Hz.

To determine whether a sealing element consisting essentially of the low-molecular-weight butyl rubber has that butyl rubber in the particular partially cured state possessing the foregoing essential rheological properties, one cuts disc specimens, about 3 mm. thick and about 50 mm. diameter, therefrom and subjects the same to analysis on the Wissenberg Rheogonometer. The discs are placed between the two circular platens of the rheogonometer. The lower platen is oscillated at various amplitudes and freqencies providing an input oscillating deformation (strain). The upper platen is coupled through a torsion bar of known spring constant to a transducer and measures the output force or load (stress). The measurements made and data taken are: the magnitudes of deformation, the magnitudes of the force, and phase shift (angle) between these signals (as well as temperature and geometry of the specimens).

The stiffness of the specimen is measured by a parameter called the complex modulus, $G^+$, which is the ratio of maximum stress divided by maximum strain. An uncrosslinked viscous specimen will exhibit a lower complex modulus than an elastic (cross-linked) specimen of similar molecular weight. The complex modulus depends on time and decreases with time for the specimens of concern. Also a higher cross-link density will give a higher complex modulus. However, the frequency, f, of oscillation is more convenient to measure than time, t, and can be related to time by the simple relationship, frequency = $1/2\pi t$, where t is time in seconds for frequency expressed in cycles per second. In this manner the complex modulus is calculated employing the measurements made for frequencies ranging from 0.006 to 19 cycles/second and is plotted as a function of frequency. From the plotted data, the complex modulus is interpolated to one cycle per second and $1/2\pi$ cycle per second ($1/2\pi$ cycle per second corresponding to 1 second as time function).

Accordingly in view of the foregoing, the scope of the invention is to be understood to be limited only insofar as set forth in the appended claims.

We claim:

1. An elongated strip as a hermetic sealing element in multiple glaze construction, which elongated strip is a tacky, moisture and vapor impervious composition consisting essentially of:
   A. a heat-processed, partially cured low-molecular-weight butyl rubber from masticating at between 280°F and 310°F for at least 12 and up to 60 minutes total masticating time of a blend of components, which for heat-processing and partial curing, in parts by weight consists essentially of:
   a. 100 parts of the low-molecular-weight butyl rubber which is a copolymer, having a viscosity average molecular weight between 10,000 and 45,000 of 96 to 95.5 parts of isobutylene and 4 to 4.5 parts of isoprene;
   b. up to 5 parts of zinc oxide;
   c. up to 10 parts of carbon black; and
   d. between 2¼ and 9 parts of a nonsulfur cure system which is devoid of sulfur and sulfur-containing constituents and which contains a constituent providing a dinitrosobenzene cross-linking moiety with i. between 1.5 and 8.5 parts total from at least two of from 0 to 2 parts of N-(2-methyl-2-nitropropyl)-4-nitrosoaniline, from 0 to 2.5 parts of tetrachloro-p-benzoquinone, and from 0.25 to 5 parts of p-quinonedioxime, and with less than one-half of said total consisting of N-(2-methyl-2-nitropropyl)-4-nitrosoaniline, and with at least 1.5 parts of tetrachloro-p-benzoquinone included when said total is 5 and greater, and ii. contains from 0 to 4 parts of lead dioxide with inclusion of between ¾ and 3¾ parts when the tetrachloro-p-benzoquinone is less than 1.5 or the total of (i) constituents is less than 5, and from 0 to ½ part of p,p-diaminodiphenylmethane with inclusion of between 0.1 and 0.5 part when the tetrachloro-p-benzoquinone is 1.5 and greater or the total of (i) constiuents is 5 and greater.

2. The elongated strip of claim 1, which includes during mastication of said blend of components of up to 2 parts per hundred thereof of an antioxidant-antiozonant stabilizer incorporated by mastication therein during the last 15 percent of the total masticating time.

3. A tacky, moisture and vapor impervious composition in an elongated strip as a hermetic glazing sealing element in multiple glaze unit construction, which composition, in parts by weight, consists essentially of:

A. a heat-processed blend of components of
  a. 100 parts of a low-molecular weight butyl rubber which is a copolymer, having a viscosity average molecular weight between 10,000 and 45,000 of 96 to 95.5 parts of isobutylene and 4 to 4.5 parts of isoprene,
  b. between 1 and 5 parts of zinc oxide,
  c. between 1 and 10 parts of carbon black,
  d. between 2¼ and 9 parts total of cure constituents including a constituent providing a dinitrosobenzene moiety with
    i. between 1.5 and 8.5 parts total from at least two of from 0 to 2 parts of N-(2-methyl-2-nitropropyl)-4-nitrosoaniline, from 0 to 2.5 parts of tetrachloro-p-benzoquinone, and from 0.25 to 5 parts of p-quinonedioxime, and with less than one-half of said total consisting of N-(2-methyl-2-nitropropyl)-4-nitrosoaniline and with at least 1.5 parts of tetrachloro-p-benzoquinone included when said total is 5 and greater, and
    ii. the remaining parts from 0 to 4 parts of lead dioxide with inclusion of between ¾ and 3¾ parts when the tetrachloro-p-benzoquinone is less than 1.5 or the total of (i) constituents is less than 5, or from 0 to ½ parts of p,p-diaminodiphenylmethane with inclusion of between 0.1 and 0.5 part when the tetrachloro-p-benzoquinone is 1.5 and greater or the total of (i) constiuents is 5 and greater, and
  e. up to 2 parts of a sym-dibetanaphthyl-p-phenylene diamine;

B. which heat-processed blend included a heat processing in which a (i) cure constituent is blended with a masticated blend of said (a), (b), and (c) components at a temperature between about 260°F and 305°F and the resulting blend then is masticated for at least 12 and up to 60 minutes total masticating time at a temperature between about 280°F and 310°F with the balance of the (i) cure constituents added and blended therewith thereafter and while at least 12 minutes of said total masticating time remains, and with the (ii) cure constituent added and blended therewith thereafter after elapsing of at least 30 percent and before elapsing of 80 percent of said total masticating time and when lead dioxide is the added (ii) cure constituent with it being added and blended at intervals in several incremental portions thereof, each incremental portion being between 10 and 60 percent of the total of said parts thereof being included, and with said (e) component, when included, added and blended therewith during the last remaining 15 percent of said total masticating time.

4. The tacky, moisture and vapor impervious composition in an elongated strip as the glazing sealing element of claim 3 in which said composition, in parts by weight, consists essentially of: the heat processed blend of components of a. 84 parts of the low-molecular-weight butyl rubber,
b. 3 parts of zinc oxide,
c. 8 parts of FEF carbon black,
d. cure constituents of
  i. 0.34 parts of N-(2-methyl-2-nitropropyl)-4-nitrosoaniline, 1.0 part of tetrachloro-p-benzoquinone, and 0.5 part of p-quinonedioxime,
  ii. 1.25 parts of lead dioxide of about 0.33 micron size, and
e. 1.25 parts of sym-dibetanapthyl-p-phenylene diamine.

5. The tacky, moisture and vapor impervious composition in an elongated strip as the glazing sealing element of claim 3 in which said composition, in parts by weight, consists essentially of: the heat processed blend of components of a. 84 parts of the low-molecular-weight butyl rubber,
b. 3 parts of zinc oxide,
c. 5.875 parts of FEF carbon black,
d. cure constituents of
  i. 0.5 parts of N-(2-methyl-2-nitropropyl)-4-nitrosoaniline, and 1.25 parts of p-quinonedioxime,
  ii. 3.125 parts of lead dioxide of about 0.33 micron size, and
e. 1.25 parts of sym-dibetanapthyl-p-phenylene diamine.

* * * * *